(12) United States Patent
Kumagai et al.

(10) Patent No.: US 12,348,861 B2
(45) Date of Patent: Jul. 1, 2025

(54) IMAGE CAPTURING APPARATUS, POWER CONTROL METHOD, AND STORAGE MEDIUM

(71) Applicant: CANON KABUSHIKI KAISHA, Tokyo (JP)

(72) Inventors: Koichi Kumagai, Saitama (JP); Taira Komatsuzaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 18/067,635

(22) Filed: Dec. 16, 2022

(65) Prior Publication Data

US 2023/0209183 A1 Jun. 29, 2023

(30) Foreign Application Priority Data

Dec. 28, 2021 (JP) ................. 2021-215139

(51) Int. Cl.
| | |
|---|---|
| *H04N 23/65* | (2023.01) |
| *G03B 7/26* | (2021.01) |
| *G03B 17/14* | (2021.01) |
| *H04N 23/55* | (2023.01) |
| *H04N 23/667* | (2023.01) |

(52) U.S. Cl.
CPC ............ *H04N 23/651* (2023.01); *G03B 7/26* (2013.01); *G03B 17/14* (2013.01); *H04N 23/55* (2023.01); *H04N 23/667* (2023.01)

(58) Field of Classification Search
CPC .... H04N 23/651; H04N 23/55; H04N 23/667; H04N 23/62; H04N 23/672; H04N 23/69; H04N 23/65; G03B 7/26; G03B 17/14
See application file for complete search history.

(56) References Cited

U.S. PATENT DOCUMENTS

| | | | | |
|---|---|---|---|---|
| 2012/0320255 | A1* | 12/2012 | Ishibashi | H04N 23/663 348/347 |
| 2020/0073462 | A1* | 3/2020 | Yamanaka | G06F 1/3212 |
| 2020/0363605 | A1* | 11/2020 | Saito | G03B 13/36 |
| 2021/0409603 | A1* | 12/2021 | Kajimura | H04N 23/683 |

FOREIGN PATENT DOCUMENTS

JP 20080083143 A 4/2008

* cited by examiner

*Primary Examiner* — Nhan T Tran
(74) *Attorney, Agent, or Firm* — Canon U.S.A., Inc., IP Division

(57) ABSTRACT

An image capturing apparatus to which a lens unit can be attached, is provided that includes an image sensor; a power supply that supplies power; and one or more processors and/or circuitry which functions as: a determination unit that determines whether or not to supply power to the lens unit based on at least one predetermined condition that includes at least one condition relating to power consumption of the lens unit; and a control unit that performs control so as not to supply actuation power to the lens unit according to a determination result by the determination unit, wherein the image sensor is capable of performing shooting even after the control unit performs control so as not to supply actuation power to the lens unit.

26 Claims, 6 Drawing Sheets

IMAGE CAPTURING APPARATUS, POWER CONTROL METHOD, AND STORAGE MEDIUM

BACKGROUND

Field

The present disclosure relates to an image capturing apparatus, a power control method, and a storage medium, and more particularly to technology for power supply control in an image capturing system with a detachable lens unit.

Description of the Related Art

The power that can be used by an image capturing apparatus such as a digital video camera is restricted by the power supply capability of the power source that supplies the power. Therefore, depending on the combination of the power supply, lens unit, setting for recording at the time of shooting, etc., there is a possibility that the power consumption of the entire image capturing apparatus may exceed the power supply capability of the power supply.

As a method for compensating for the power shortage, Japanese Patent Laid-Open No. 2008-083143 discloses techniques for increasing the number of shots and time when shooting can be performed in an image capturing apparatus in which both a camera body and a lens unit are equipped with battery power sources by controlling to compensate for the decrease or shortage of power between the batteries.

However, in Japanese Patent Laid-Open No. 2008-083143, control cannot be performed if the lens unit attached to the image capturing apparatus is not equipped with a power supply. In addition, even if power is supplied from the battery power sources of both the camera body and the lens unit, it is not possible to cope with power shortage of the image capturing apparatus as a whole.

SUMMARY

Various embodiments of the present disclosure provide for stably distributing power required for shooting in an image capturing system with a detachable lens unit.

According to one embodiments of the present disclosure, an image capturing apparatus is provided to which a lens unit can be attached. The image capturing apparatus includes an image sensor; a power supply that supplies power; and one or more processors and/or circuitry which functions as: a determination unit that determines whether or not to supply power to the lens unit based on at least one predetermined condition that includes at least one condition relating to power consumption of the lens unit; and a control unit that performs control so as not to supply actuation power to the lens unit according to a determination result by the determination unit, wherein the image sensor is capable of performing shooting even after the control unit performs control so as not to supply actuation power to the lens unit.

Further, according to the present disclosure, provided is a power control method in an image capturing apparatus, having an image sensor, to which a lens unit can be attached, comprising: receiving power supplied from a power supply; determining whether or not to supply power to the lens unit based on at least one predetermined condition that includes a condition relating to power consumption of the lens unit; and controlling not to supply actuation power to the lens unit according to a determination result by the determination unit, wherein the image sensor is capable of performing shooting even after the controlling performs control so as not to supply actuation power to the lens unit.

Furthermore, according to the present disclosure, provided is a non-transitory computer-readable storage medium, the storage medium storing a program that is executable by the computer, wherein the program includes program code for causing the computer to perform as a power control method in an image capturing apparatus, having an image sensor, to which a lens unit can be attached, comprising: receiving power supplied from a power supply; determining whether or not to supply power to the lens unit based on at least one predetermined condition that includes a condition relating to power consumption of the lens unit; and controlling not to supply actuation power to the lens unit according to a determination result by the determination unit, wherein the image sensor is capable of performing shooting even after the controlling performs control so as not to supply actuation power to the lens unit.

Further features of the present disclosure will become apparent from the following description of example embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Figure 1:
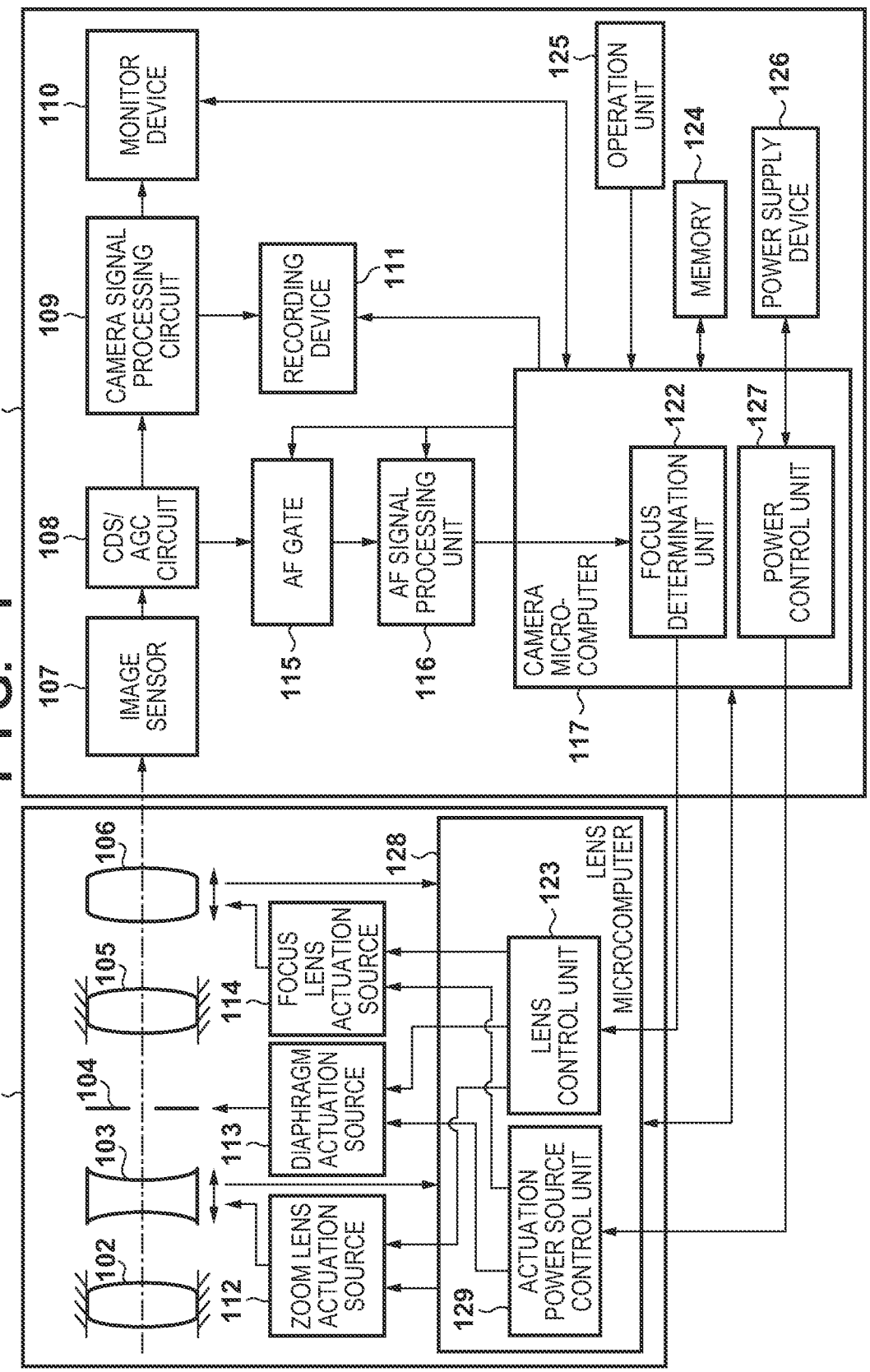
FIG. 1 is a block diagram showing a functional configuration of an image capturing apparatus according to an embodiment of the disclosure.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, note that the same reference numerals are given to the same or similar configurations in the description below, and thereby redundant description thereof is omitted.

First Embodiment

A first embodiment of the present disclosure will be described below.

(Configuration of Apparatus)

FIG. 1 is a block diagram showing a functional configuration of a digital camera as an example of an image capturing apparatus of this embodiment.

In FIG. 1, a lens unit 101 has a lens group, actuation sources for lenses, a lens controller, etc., and is attachable to and detachable from a camera body 100. A fixed first lens group 102, a zoom lens 103, a diaphragm 104, a fixed second lens group 105, a focus lens 106, and so forth constitute an imaging optical system for forming an image with light from a subject. A zooming operation is performed by moving the zoom lens 103 in an optical axis direction, and the focus lens 106 has both a function of compensating for the movement of the focal plane accompanying zooming and a focusing function. Further, the lens unit 101 includes members (not shown) for detecting lens positions of the zoom lens 103 and the focus lens 106, and information on the detected positions of the respective lenses are sent to a lens control unit 123.

A zoom lens actuation source 112, a focus lens actuation source 114, and a diaphragm actuation source 113 are composed of actuators such as stepping motors, DC motors, vibration motors, and voice coil motors. The zoom lens actuation source 112 moves the zoom lens 103 for zooming, the focus lens actuation source 114 moves the focus lens 106 for adjusting focus, and the diaphragm actuation source 113 moves the diaphragm 104 for adjusting an aperture.

An image sensor 107 as a photoelectric conversion device is configured by including a CCD sensor or CMOS sensor and its peripheral circuitry. The image sensor 107 photoelectrically converts an image of a subject formed by light that has passed through the imaging optical system, and outputs an electric signal. A CDS/AGC circuit 108 samples the output from the image sensor 107 and adjusts the gain. A camera signal processing circuit 109 performs predetermined image processing on the output signal from the CDS/AGC circuit 108 to generate an image signal.

A monitor device 110 is configured by an LCD or the like, and displays information about the shooting mode of the camera, a focus detection frame that serves as a guide for a set focus detection area, and the like, in addition to the image signal from the camera signal processing circuit 109.

A recording device 111 records the image signal from the camera signal processing circuit 109 on a storage medium such as a magnetic tape, an optical disk, a semiconductor memory, and so forth.

An AF gate 115 extracts a signal in a region preset by a camera microcomputer 117 from the output signal of the CDS/AGC circuit 108 and outputs the extracted signal to an AF signal processing unit 116. The AF signal processing unit 116 detects a focus state based on the signal that has passed through the AF gate 115. Here, for example, if the pixels of the image sensor 107 have a pupil division function, a pair of signals having parallax may be obtained and an image shift amount between the pair of signals may be found for known on-imaging plane phase difference AF. Alternatively, the contrast of the signal may be detected for known contrast AF.

A focus determination unit 122 of the camera microcomputer 117 determines the in-focus position based on the information indicating the focus state such as the image shift amount and contrast obtained from the AF signal processing unit 116, calculates the amount for moving the focus lens 106, and sends it to a lens microcomputer 128.

In the lens microcomputer 128, the lens control unit 123 actuates the focus lens 106 by controlling the focus lens actuation source 114 based on the received amount for moving the focus lens 106, thereby AF control is performed.

The camera microcomputer 117 also includes a zoom actuation processing unit (not shown), and in a case where zooming is requested by a user operation, for example, the zoom actuation processing unit determines an amount for moving the zoom lens 103 based on the user operation, and sends the determined moving amount to the lens microcomputer 128. In the lens microcomputer 128, the lens control unit 123 controls the zoom lens actuation source 112 based on the received amount for moving the zoom lens 103, thereby actuating the zoom lens 103.

Similarly, the camera microcomputer 117 has a diaphragm actuation control unit (not shown), and in a case where changing of an aperture is requested by a user operation or in a case where it is necessary to change the aperture according to a photometry result, for example, the diaphragm actuation control unit determines an amount for moving the diaphragm 104, and sends the determined amount to the lens microcomputer 128. In the lens microcomputer 128, the lens control unit 123 controls the diaphragm actuation source 113 based on the received amount for moving the diaphragm 104, thereby actuating the diaphragm 104.

In this embodiment, the camera microcomputer 117 communicates with the lens microcomputer 128 periodically or at arbitrary timings. Through this communication, the camera microcomputer 117 acquires lens information (lens identification information, lens position, aperture value, etc.). The lens information obtained by this communication is stored in a memory 124.

In addition to the lens information mentioned above, the memory 124 also stores camera information (information periodically or arbitrarily obtained from each component that constitutes the camera body 100, camera setting values at the time of current or previous startup, predefined fixed values required for a given process, and the like).

An operation unit 125 connected to the camera microcomputer 117 is used for inputting various setting items of the camera. Further, the monitor device 110 includes a touch operation member (not shown) that realizes the same input function as the operation unit 125 by touching an arbitrary position on the monitor with a finger or the like. By operating the operation unit 125 and/or touching the touch operation member on the monitor device 110, the user can select a subject, change shooting setting items of the camera, and the like.

The power supply from a power supply device 126 to each of the components constituting the digital camera that require power supply is controlled by a power control unit 127 in the camera microcomputer 117, and the power to be used in each of the components in the lens unit 101 and camera body 100 is supplied. As the power supply device 126, an arbitrary device can be selected from at least one or more devices (for example, a built-in battery, a battery detachable from the camera, a DC coupler, an AC adapter, etc.). The power supply to the zoom lens actuation source 112, the diaphragm actuation source 113, and the focus lens actuation source 114 in the lens unit 101 is controlled by an actuation power source control unit 129. The actuation power source control unit 129 controls power supply to each actuation source in accordance with the control information from the power control unit 127 in the camera microcomputer 117.

Hereinafter, for convenience of explanation, at least one or more of the zoom lens actuation source 112, the diaphragm actuation source 113, and the focus lens actuation source 114 will be collectively referred to as a lens actuator.

(Power Control at the Time of Starting-Up the Image Capturing Apparatus and at the Time of Attaching the Lens Unit)

Figure 2:
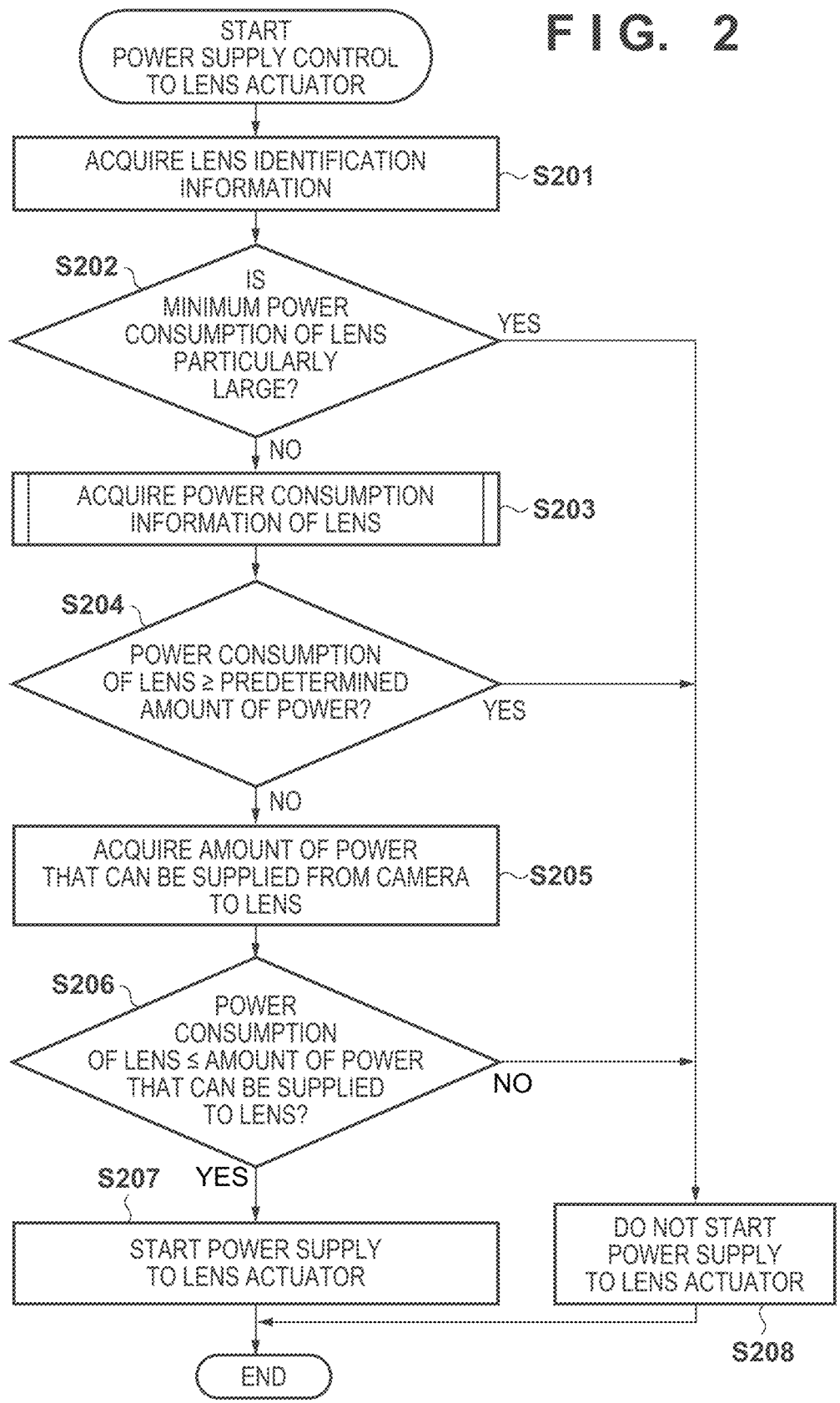
FIG. 2 is a flowchart showing power control processing at the time of starting-up the image capturing apparatus and at the time of attaching a lens unit according to a first embodiment.

Next, with reference to the flowchart of FIG. 2, the power control at the time of starting-up the image capturing apparatus and at the time of attaching the lens unit in the first embodiment will be described. In the explanation below, a series of power controls are executed based on instructions from the camera microcomputer 117 unless otherwise specified.

First, the processing procedure of the entire power control at the time of starting-up the image capturing apparatus and at the time of attaching the lens unit will be described with reference to FIG. 2. This processing procedure is executed at the time of starting-up the camera body 100, or at the time of attaching the lens unit 101 while the camera body 100 is activated.

In step S201, the camera microcomputer 117 acquires lens identification information from the lens unit 101, and the process proceeds to step S202. In step S202, the camera microcomputer 117 determines whether or not the lens unit 101 is a lens unit whose minimum power consumption is particularly large (first condition) based on the lens identification information acquired in step S201 and the lens information stored in advance in the memory 124. Here, the lens information stored in advance in the memory 124 includes, for example, the lens identification information of a lens unit/units whose minimum power consumption is particularly large, or the lens information corresponding to the lens identification information indicating that the minimum power consumption is particularly large. Note that a lens unit "whose minimum power consumption is particularly large" refers to a lens unit that always runs short of power regardless of the settings of the camera body 100. For example, a zoom lens unit having a large lens group and a lens unit having an extremely large lens diameter may be assumed. Therefore, as a specific example of the lens information used here, for example, information obtained by measuring the minimum power consumption of each lens unit in advance and associating information indicating that the minimum power consumption is equal to or greater than a predetermined threshold value with identification information of the corresponding lens unit may be considered. Alternatively, the lens information may be a list of identification information of lens units whose minimum power consumption measured in advance is equal to or greater than a predetermined threshold value, or information that holds the minimum power consumption of lens units measured in advance associated with the identification information. In the latter case, determination can be made by comparing the minimum power consumption corresponding to the identification information of the lens unit with a predetermined threshold value.

If the minimum power consumption of the lens unit is particularly large, the process proceeds to step S208, and power control ends without starting power supply to the lens actuator. If the minimum power consumption of the lens unit is not particularly large, the process proceeds to step S203.

In step S203, the power consumption information of the lens unit 101 is acquired, and the process proceeds to step S204. Note that the procedure for acquiring the power consumption information of the lens unit 101 performed in step S203 will be described later with reference to FIG. 3.

In step S204, based on the power consumption information of the lens unit 101 acquired in step S203, it is determined whether the power consumption is equal to or greater than a predetermined amount of power (second condition). Note that the predetermined amount of power may be, for example, a value based on an amount of power that can be supplied from the camera body 100 to the lens unit 101, which is obtained by actual measurement in advance. If the acquired power consumption is equal to or greater than the predetermined amount of power, the process proceeds to step S208, and ends the processing procedure without starting power supply to the lens actuator. If the acquired power consumption is less than the predetermined amount of power, the process proceeds to step S205.

In step S205, the amount of power that can be supplied from the camera body 100 to the lens unit 101 is acquired, and the process proceeds to step S206. The amount of power that can be supplied from the camera body 100 to the lens unit 101 is determined by comparing the amount of power supplied from the power supply device 126 to the camera body 100 with the power consumption of the camera body 100. The power consumption of the camera body 100 is determined based on the power consumption of each component, including those shown and not shown, that requires power supply in the camera body 100.

In step S206, the camera microcomputer 117 compares the amount of power that can be supplied from the camera body 100 to the lens unit 101 and the power consumption of the lens unit 101 (third condition). If the amount of power that can be supplied from the camera body 100 to the lens unit 101 is greater than or equal to the power consumption of the lens unit 101, the process proceed to step S207 where power supply to the lens actuator is started, and the processing is ended. On the other hand, if the amount of power that can be supplied from the camera body 100 to the lens unit 101 is smaller than the power consumption of the lens unit 101, the process proceeds to step S208 and the processing ends without starting power supply to the lens actuator.

(Acquisition of Lens Power Consumption Information)

Figure 3:
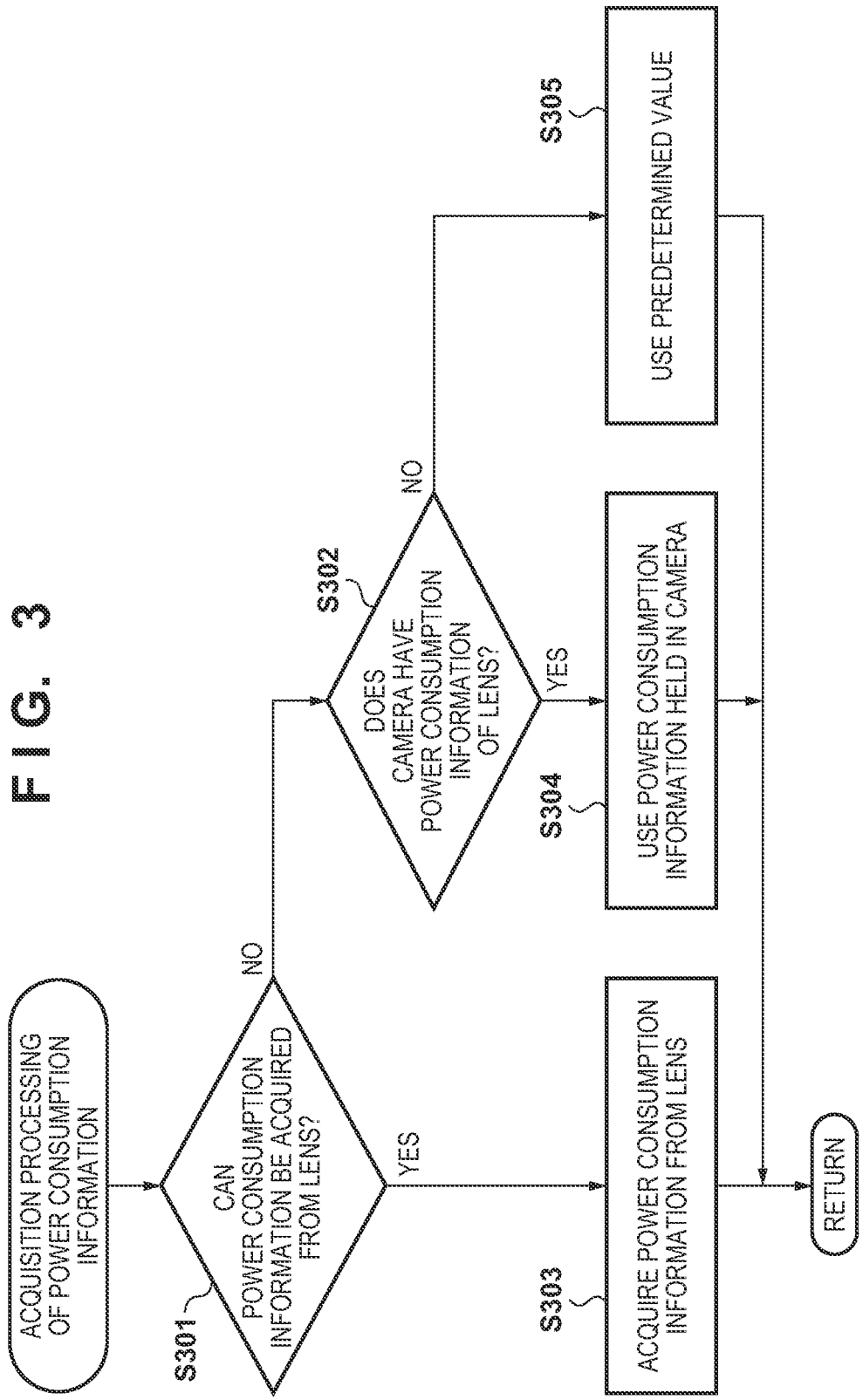
FIG. 3 is a flowchart showing power consumption information acquisition processing of the lens unit according to the first and second embodiments.

Next, the acquisition processing of power consumption information of a lens unit performed in step S203 of FIG. 2 will be described with reference to FIG. 3.

In step S301, the camera microcomputer 117 determines whether power consumption information of the lens unit 101 can be acquired from the lens unit 101. If it can be acquired, the process advances to step S303 to acquire the power consumption information of the lens unit 101, and the processing ends. If it cannot be acquired, the process proceeds to step S302.

In step S302, it is checked whether or not the power consumption information of the lens unit 101 is present in the camera body 100. This information is power consumption information or the like, stored in the memory 124, for example, indicated by lens information corresponding to the lens identification information. If the power consumption information is present, the process proceeds to step S304, where the power consumption information of the lens unit 101 held in the camera body 100 is determined to be used as the power consumption of the lens unit 101 in the subsequent processes, and the processing ends. If not, the process proceeds to step S305, where a predetermined value is determined to be used as the power consumption of the lens unit 101 in the subsequent processes, and the processing ends. The predetermined value may be, for example, a designed maximum amount of power that can be supplied from the camera body 100 to the lens unit 101, a power consumption of the lens unit, and the like, which are stored in the memory 124.

(Power Control Processing in a Shootable State and at the Time of Executing Shooting)

Figure 4:
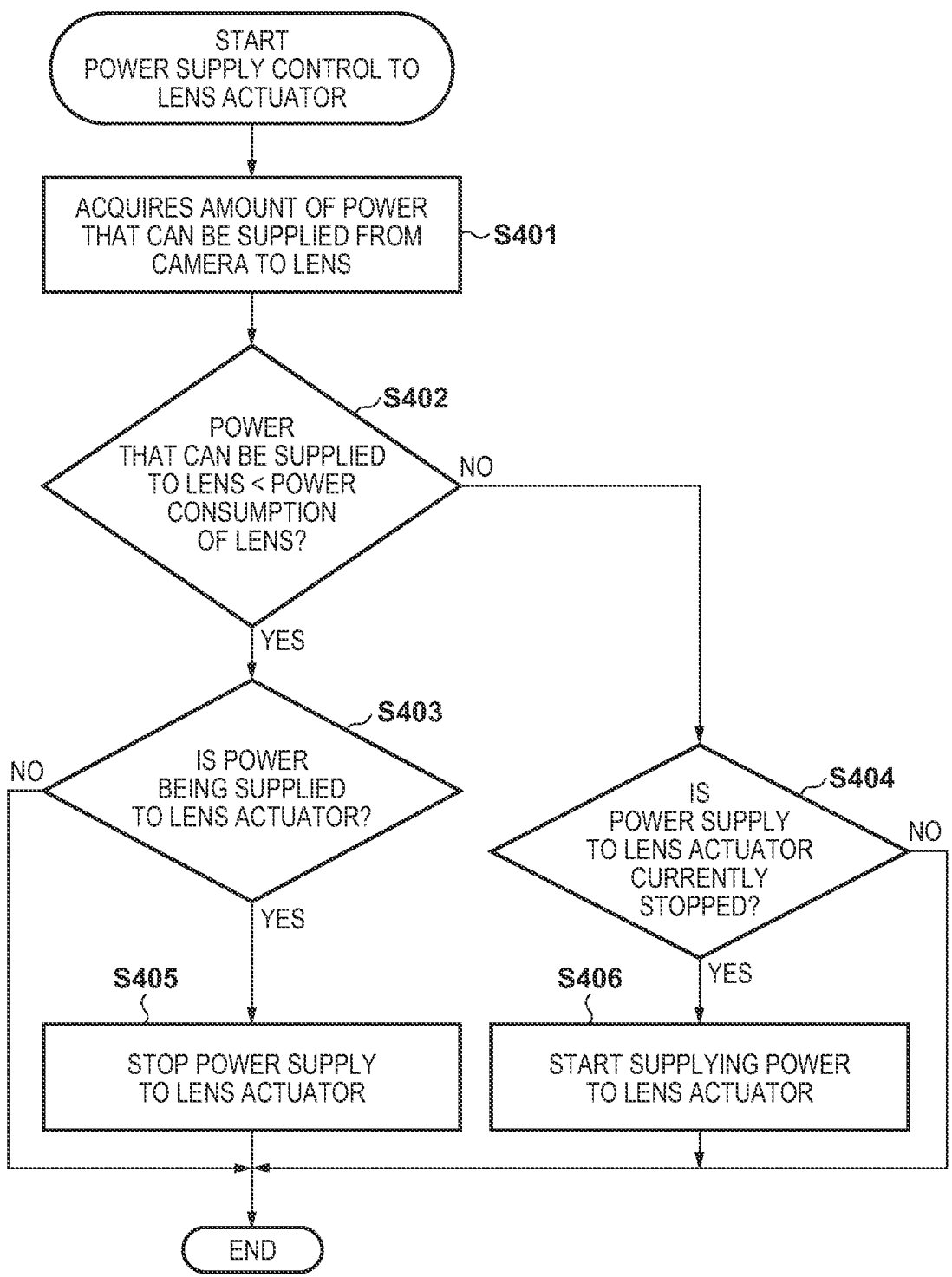
FIG. 4 is a flowchart showing power control processing in a shootable state and at the time of executing shooting according to the first embodiment.

After starting-up the image capturing apparatus or after attaching the lens, the camera body 100 executes a series of processes including power control processing at the time of starting-up the image capturing apparatus and at the time of attaching the lens as described above, and then shifts to a shootable state. In the shootable state and at the time of executing shooting, changes such as changes in the power supply type and changes in settings for recording that may cause changes in the amount of power supplied to the camera body 100 and changes in the power consumption of the camera body 100 may occur. Here, the power control in the shootable state and at the time of executing shooting in the first embodiment will be described with reference to the flowchart of FIG. 4.

Note that this processing is repeatedly executed, for example, at the readout cycle of an image signal from the image sensor 107. Also, this processing is not applied to the lens unit whose minimum power consumption is determined to be particularly large in step S202 of FIG. 2 and to the lens unit whose power consumption is determined to be greater than or equal to a predetermined amount of power in step S204.

In step S401, the camera microcomputer 117 acquires the amount of power that can be supplied from the camera body 100 to the lens unit 101, and the process proceeds to step S402.

In step S402, it is determined whether or not the power consumption of the lens unit 101 acquired in step S203 is greater than the power that can be supplied to the lens unit 101 acquired in step S401. If the power consumption of the lens unit 101 is greater than the power that can be supplied to the lens unit 101, the process proceeds to step S403, whereas if the power consumption of the lens unit 101 is equal to or less than the power that can be supplied to the lens unit 101, the process proceeds to step S404.

In step S403, it is determined whether or not power is being supplied to the lens actuator. If power is not being supplied, then the processing is ended. If power is being supplied, the process proceeds to step S405, the power supply to the lens actuator is terminated, and the processing is ended.

On the other hand, in step S404, it is determined whether or not power supply to the lens actuator is currently stopped. If the power supply is not currently stopped, then the processing is ended. If the power supply is currently stopped, the process proceeds to step S406, where the power supply to the lens actuator is started, and the processing is ended.

It should be noted that the above-described power control in the shootable state and at the time of executing shooting does not necessarily have to be repeatedly executed in the above-described cycle. For example, a configuration may be such that a change in the fluctuation factor of the amount of power supplied to the image capturing apparatus or of the power consumption of the image capturing apparatus, or a change in the amount of power supplied to the image capturing apparatus or the power consumption of the image capturing apparatus may be detected, and the power control may be executed upon detecting the change.

As described above, according to the first embodiment, power control to the lens actuator is executed based on the amount of power supplied to the camera body, the power consumption of the lens unit, and the power consumption of the camera body. This makes it possible to realize power control for keeping the power supply to the camera system and enabling continuation of shooting.

Second Embodiment

Next, a second embodiment of the present disclosure will be described. Note that the configuration of the image capturing apparatus according to the second embodiment is the same as that described with reference to FIG. 1, so the description thereof will be omitted here. In the second embodiment, power control in a case where the camera body 100 can set a lens actuation guarantee mode will be described.

The lens actuation guarantee mode is a mode in which power supply to the lens actuator is continued as long as possible even when power supply to the image capturing apparatus is not enough. If the lens actuation guarantee mode is set, processing to save limitable power consumption other than the power supplied to the lens unit is performed. In addition, since the description of the second embodiment is partially overlaps with that of the first embodiment, the description thereof is omitted as appropriate.

(Power Control at the Time of Starting-up the Image Capturing Apparatus and at the Time of Attaching the Lens Unit)

Figure 5:
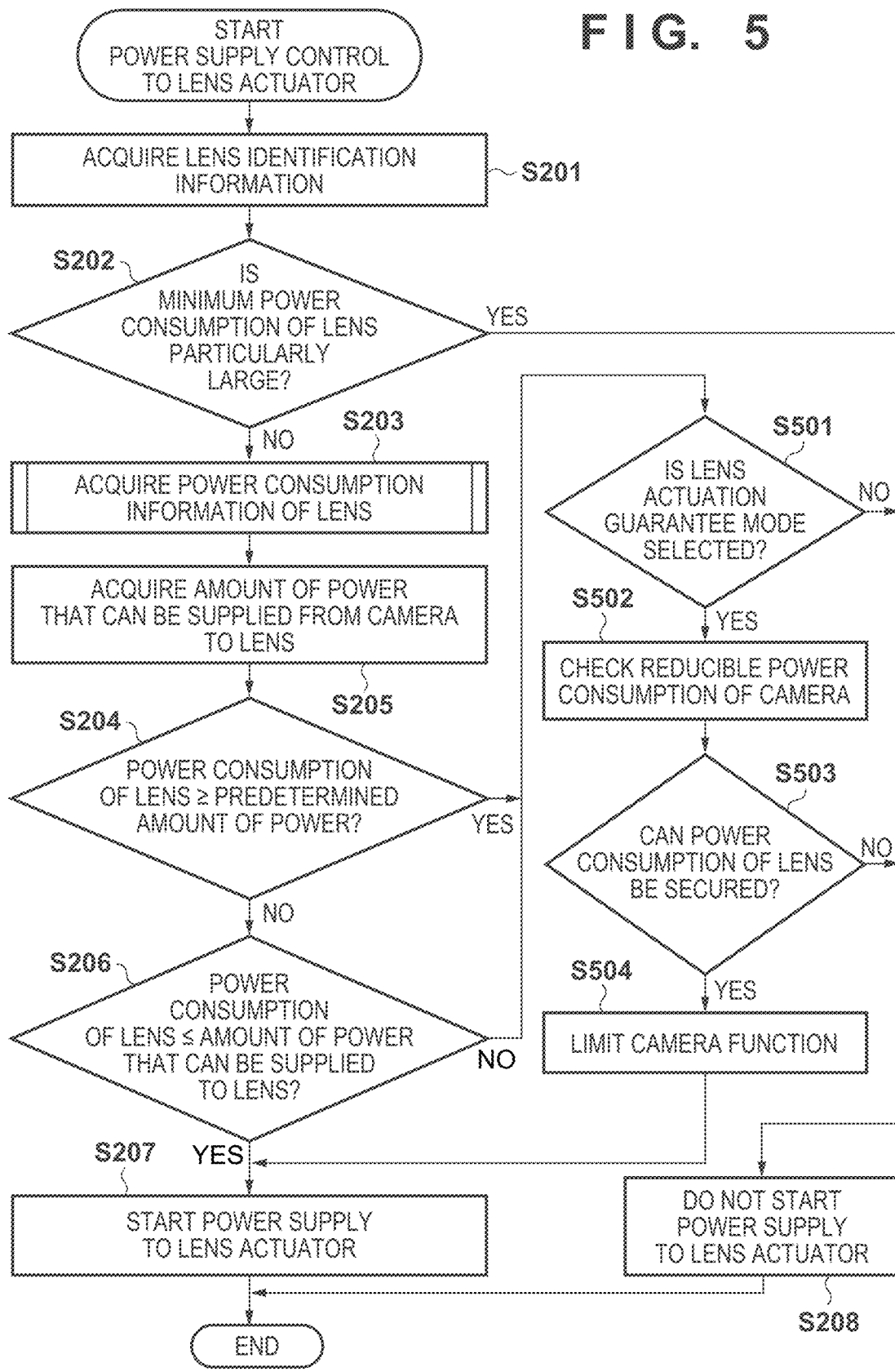
FIG. 5 is a flowchart showing power control processing at the time of starting-up the image capturing apparatus and at the time of attaching a lens unit according to the second embodiment.

Power control at the time of starting-up the image capturing apparatus and at the time of attaching the lens unit in the second embodiment will be described with reference to the flowchart of FIG. 5. This processing is executed in a case where the same conditions as those of the power control at the time of starting-up the image capturing apparatus and at the time of attaching the lens in the first embodiment are satisfied. In FIG. 5, the same step numbers are given to the same processes as those shown in FIG. 2, and the explanation thereof is omitted as appropriate. In the processing in FIG. 5, the order of the process performed in step S204 for determining whether the power consumption of the lens unit is greater than or equal to a predetermined amount of power is different.

In step S204, based on the power consumption information of the lens unit 101 acquired in step S203, it is determined whether the power consumption is equal to or greater than the predetermined amount of power, and if not, the process proceeds to step S206, and if so, the process proceeds to step S501.

Also, in step S206, the camera microcomputer 117 compares the amount of power that can be supplied from the camera body 100 to the lens unit 101 with the power consumption of the lens unit 101. If the amount of power that can be supplied to the lens unit 101 is greater than or equal to the power consumption of the lens unit 101, the process proceeds to step S207, power supply to the lens actuator is started, and end the processing. On the other hand, if the amount of power that can be supplied to the lens unit 101 is smaller than the power consumption of the lens unit 101, the process proceeds to step S501.

In step S501, it is determined whether or not the lens actuation guarantee mode is set. If not set, the process proceeds to step S208 and then the processing is ended without starting power supply to the lens actuator. On the other hand, if the lens actuation guarantee mode is set, the process proceeds to step S502.

In step S502, it is calculated how much the power consumption of the camera body 100 can be reduced by limiting predetermined camera functions. After calculating the reducible power consumption, the process proceeds to step S503. The predetermined camera functions include, for example, brightness of the monitor device 110, image recording, power supply to externally connected devices, rotation speed of cooling fan, readout cycle of the image sensor 107, recording to external recorder, and the like. The reducible power consumption of a combination of at least one or more of these functions is checked.

In step S503, based on the reducible power consumption obtained in step S502, whether or not the amount of power that can be supplied from the camera body 100 to the lens unit 101 would become equal to or greater than the power consumption of the lens unit 101 by limiting a predetermined camera function or functions (fourth condition). If the power that can be supplied to the lens unit 101 does not exceed the power consumption of the lens unit 101 even if the predetermined camera function or functions are limited, the process proceeds to step S208, and then the processing is ended without starting-up power supply to the lens actuator. On the other hand, if the power that can be supplied to the lens unit 101 would become greater than or equal to the power consumption of the lens unit 101 by limiting the predetermined camera function or functions, the process proceeds to step S504.

In step S504, after limiting one or more predetermined camera functions in combination so that the amount of power that can be supplied to the lens unit 101 becomes greater than or equal to the power consumption of the lens, the process proceeds to step S207, where power supply to the lens actuator is started, and then the processing is ended.

As for a method for selecting the camera function or functions, for example, the user may arbitrarily select the function or functions or the power control unit 127 may automatically determine the function or functions under a condition that the power supply to the lens actuator can be maintained. In a case where the user selects a camera function or functions to be limited, the operation unit 125, a touch operation member (not shown) arranged on the monitor device 110, a lens operation member (not shown), and an operation member such as a remote controller may be used for selection.

(Power Control Processing in the Shootable State and at the Time of Executing Shooting)

Next, the power control in the shootable state and at the time of executing shooting in the second embodiment will be described with reference to the flowchart of FIG. 6. In the processing of the power control in the shootable state and at the time of executing shooting in the second embodiment, the processes to be executed differ depending on whether or not the lens actuation guarantee mode is set. The processing in the second embodiment differs from the processing in the first embodiment described with reference to FIG. 4 in that control according to whether or not the lens actuation guarantee mode is set as shown in steps S601 to S607 is added. Since the other processes are the same as those in FIG. 4, the same step numbers are given and the description thereof is omitted as appropriate. Note that this processing is not applied to the lens unit whose minimum power consumption is determined to be particularly large in step S202 of FIG. 5.

In step S402, it is determined whether or not the power consumption of the lens unit 101 obtained in step S401 is greater than the amount of power that can be supplied from the camera body 100 to the lens unit 101. If the power consumption of the lens unit 101 is greater than the amount of power that can be supplied to the lens unit 101, the process proceed to step S601, whereas if the power consumption of the lens unit 101 is equal to or less than the amount of power that can be supplied to the lens unit 101, the process proceed to step S604.

In step S604, it is determined whether or not there is a limited camera function or functions. If there is a limited camera function or functions, the process proceeds to step S605, and if there is no limited camera function, the process proceeds to step S404.

In step S605, it is calculated how much the power consumption of the camera body 100 increases by releasing the limited camera function or functions. For example, in a case where a plurality of camera functions are limited, the power consumption that increases by releasing the limitation of each camera function is obtained. After the calculation, the process proceeds to step S606.

In step S606, based on the increased power consumption calculated in step S605, it is determined whether or not the state in which the amount of power that can be supplied to the lens unit 101 is greater than or equals to the power consumption of the lens unit 101 can be maintained in a case where at least one of the limited camera function or functions is released. If the state can be maintained, the process advances to step S607 to release the limitation of the releasable camera function or functions, and the process advances to step S404. If the state cannot be maintained, the process proceeds to step S404 while keeping limitation of the camera function or functions.

On the other hand, in step S601, it is calculated how much the power consumption of the camera body 100 can be reduced by limiting predetermined camera function or functions. After calculating the reducible power consumption, the process proceeds to step S602.

In step S602, it is determined whether or not the amount of power that can be supplied to the lens unit 101 would become greater than or equals to the power consumption of the lens unit 101 by limiting a predetermined camera function or functions based on the reducible power consumption obtained in step S601. If the amount of power that can be supplied to the lens unit 101 does not become greater than or equal to the power consumption of the lens unit 101 even if the predetermined camera function or functions are limited, the process proceeds to step S403. On the other hand, if the amount of power that can be supplied to the lens unit 101 would become greater than or equal to the power consumption of the lens unit 101 by limiting a predetermined camera function or functions the process proceeds to step S603. In step S603, after limiting one or more predetermined camera functions in combination so that the amount of power that can be supplied to the lens unit 101 is greater than or equal to the power consumption of the lens, the process proceeds to step S404.

As described above, according to the second embodiment, by providing the lens actuation guarantee mode, in addition to the effects of the first embodiment, it is possible to maintain power supply to the lens actuator as long as possible.

Figure 6:
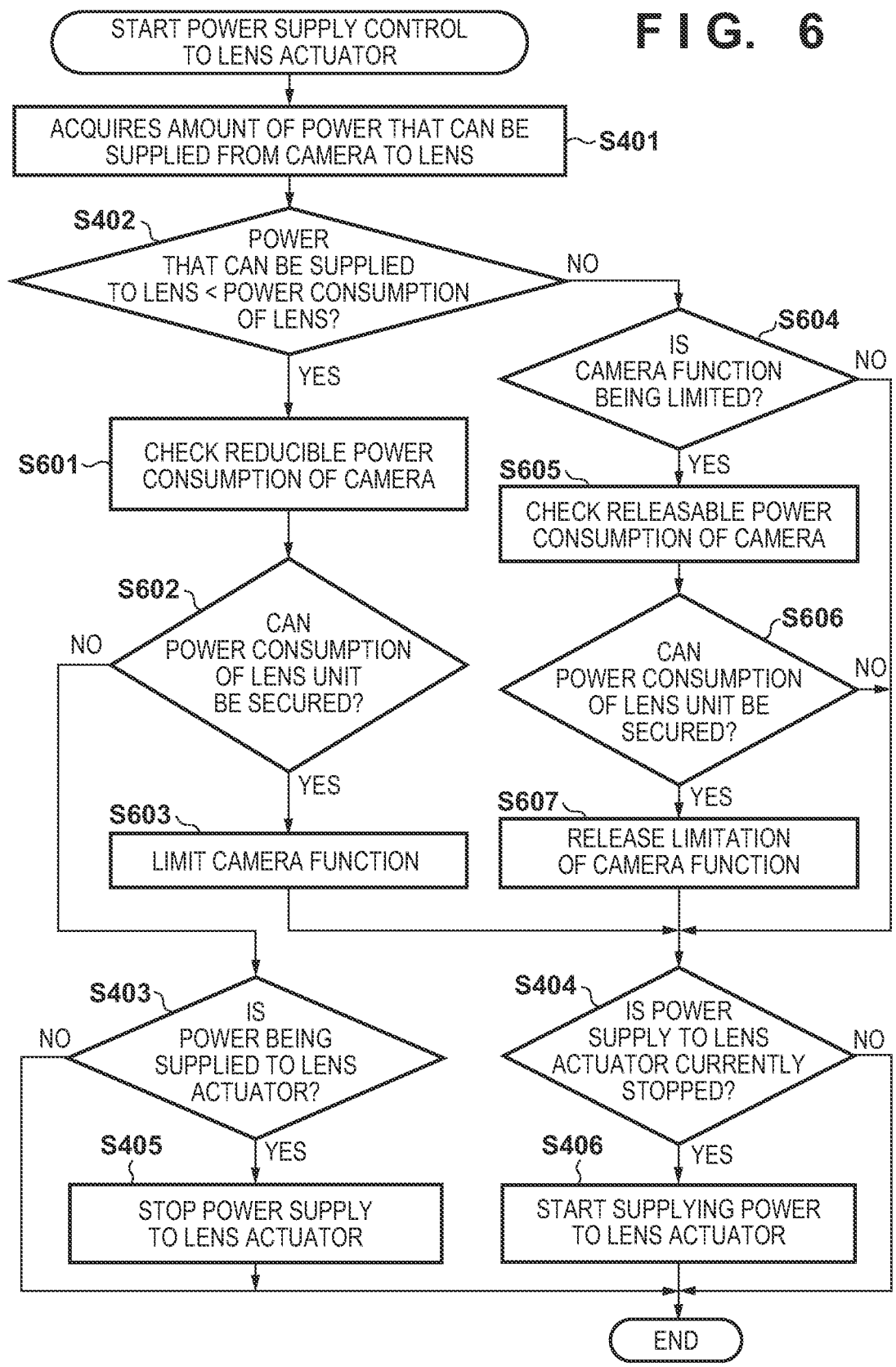
FIG. 6 is a flowchart showing power control processing in a shooting stand-by state and at the time of shooting execution according to the second embodiment.

In the second embodiment, the processing shown in FIGS. 5 and 6 is performed if the lens actuation guarantee mode is set, however, the processing shown in FIGS. 5 and 6 may be performed regardless of the lens actuation guarantee mode.

Other Embodiments

Various embodiments of the present disclosure may be applied to a system composed of a plurality of devices or to an apparatus composed of a single device.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-215139, filed Dec. 28, 2021 which is hereby incorporated by reference herein in its entirety.

What is claimed is:

1. An image capturing apparatus to which a lens unit can be attached, comprising:
   an image sensor;
   a power supply that supplies power; and
   one or more processors and/or circuitry which functions as:
      a determination unit that determines whether or not to supply power to the lens unit based on at least one predetermined condition that includes at least one condition relating to power consumption of the lens unit;
      a control unit that performs control so as not to supply actuation power to the lens unit according to a determination result by the determination unit; and
      an acquisition unit that acquires an amount of power that can be supplied to the lens unit out of an amount of power supplied from the power supply,
   wherein the image sensor is capable of performing shooting even after the control unit performs control so as not to supply actuation power to the lens unit,
   wherein the at least one predetermined condition includes a plurality of conditions relating to the power consumption,
   wherein a second condition of the plurality of conditions relating to the power consumption is that power consumption of the lens unit is less than a predetermined amount of power, and
   in a case where the second condition is not satisfied, the acquisition unit calculates an amount of power that can be supplied to the lens unit if power consumption in the image capturing apparatus is reduced by limiting one or more of predetermined functions of the image capturing apparatus, and
   wherein a fourth condition of the plurality of conditions relating to the power consumption is that the power consumption of the lens unit is less than the calculated amount of power that can be supplied to the lens unit, and
   in a case where the fourth condition is not satisfied, the determination unit determines not to supply power to the lens unit.

2. The image capturing apparatus according to claim 1, wherein, among the plurality of conditions relating to the power consumption, a first condition is that minimum power consumption of the lens unit is equal to or less than a predetermined first amount of power, and
   in a case where the first condition is not satisfied, the determination unit determines not to supply power to the lens unit.

3. The image capturing apparatus according to claim 1 wherein the power consumption of the lens unit is either of power consumption acquired from the lens unit, power consumption of the lens unit stored in advance in a memory, or predetermined power consumption.

4. The image capturing apparatus according to claim 3, wherein the predetermined power consumption is a designed maximum amount of power that can be supplied to the lens unit or designed power consumption of the lens unit.

5. The image capturing apparatus according to claim 1, wherein, in a case where a mode indicating to attempt to continue power supply to the lens unit is set, the determination unit determines whether or not the fourth condition is satisfied.

6. The image capturing apparatus according to claim 1, wherein the amount of power that can be supplied to the lens unit is an amount of power obtained by subtracting an amount of power required to maintain an operation of the image capturing apparatus from an amount of power supplied from the power supply.

7. The image capturing apparatus according to claim 1,
   wherein a third condition of the plurality of conditions relating to the power consumption is that power consumption of the lens unit is equal to or less than an amount of power that can be supplied to the lens unit, and
   in a case where the third condition is not satisfied, the determination unit determines not to supply power to the lens unit.

8. The image capturing apparatus according to claim 7, wherein the amount of power that can be supplied to the lens unit is an amount of power obtained by subtracting an amount of power required to maintain an operation of the image capturing apparatus from an amount of power supplied from the power supply.

9. The image capturing apparatus according to claim 1, wherein, in a case where the plurality of conditions relating to the power consumption are satisfied, the determination unit determines to supply power to the lens unit.

10. The image capturing apparatus according to claim 1, wherein the acquisition unit repeatedly acquires an amount of power that can be supplied to the lens unit out of an amount of power supplied from the power supply,
    wherein after the determination unit determines to supply power to the lens unit,
       in a case where power is being supplied to the lens unit and power consumption of the lens unit is larger than the amount of power that can be supplied to the lens unit, the acquisition unit calculates an amount of power that can be supplied to the lens unit if power consumption in the image capturing apparatus is reduced by limiting one or more of predetermined functions of the image capturing apparatus,
       in a case where the power consumption of the lens unit is larger than a calculated amount of power that can be supplied to the lens unit, the determination unit determines to stop supplying power to the lens unit, in a case where power supply to the lens unit is currently stopped, the acquisition unit recalculates an amount of power that can be supplied to the lens unit if power consumption in the image capturing apparatus is reduced by limiting one or more of predetermined functions of the image capturing apparatus, and in a case where the power consumption of the lens unit is equal to or less than the recalculated amount of power that can be supplied to the lens unit, the determination unit determines to start supplying power to the lens unit.

11. The image capturing apparatus according to claim 1, wherein the acquisition unit repeatedly acquires an amount of power that can be supplied to the lens unit out of an amount of power supplied from the power supply, wherein, in a case where the plurality of conditions relating to the power consumption are satisfied, in a case where power is being supplied to the lens unit and power consumption of the lens unit is larger than an amount of power that can be supplied to the lens unit, the determination unit determines to stop supplying power to the lens unit; and in a case where power is not currently supplied to the lens unit and power consumption of the lens unit is equal to or less than an amount of power that can be supplied to the lens unit, the determination unit determines to start supplying power to the lens unit.

12. The image capturing apparatus according to claim 1, wherein a third condition of the plurality of conditions relating to the power consumption is that power consumption of the lens unit is equal to or less than an amount of power that can be supplied to the lens unit, and in a case where the third condition is not satisfied, the acquisition unit calculates an amount of power that can be supplied to the lens unit if power consumption in the image capturing apparatus is reduced by limiting one or more of predetermined functions of the image capturing apparatus.

13. The image capturing apparatus according to claim 1, wherein, in a case where the plurality of conditions relating to the power consumption except for the fourth condition are satisfied and in a case where the fourth condition is satisfied instead of the second condition of the plurality of conditions relating to the power consumption, the determination unit determines to supply power to the lens unit.

14. The image capturing apparatus according to claim 12, wherein the amount of power that can be supplied to the lens unit is an amount of power obtained by subtracting an amount of power required to maintain an operation of the image capturing apparatus from an amount of power supplied from the power supply.

15. The image capturing apparatus according to claim 14, wherein, in a case where the plurality of conditions relating to the power consumption except for the fourth condition are satisfied and in a case where the fourth condition is satisfied instead of the third condition of the plurality of conditions relating to the power consumption is satisfied, the determination unit determines to supply power to the lens unit.

16. The image capturing apparatus according to claim 14, wherein, in a case where a mode indicating to attempt to continue power supply to the lens unit is set, the determination unit determines whether or not the fourth condition is satisfied.

17. The image capturing apparatus according to claim 14, wherein the amount of power that can be supplied to the lens unit is an amount of power obtained by subtracting an amount of power required to maintain an operation of the image capturing apparatus from an amount of power supplied from the power supply.

18. The image capturing apparatus according to claim 15, wherein the acquisition unit repeatedly acquires the amount of power that can be supplied to the lens unit, and wherein after the determination unit determines to supply power to the lens unit, in a case where power is being supplied to the lens unit and power consumption of the lens unit is larger than the amount of power that can be supplied to the lens unit, the acquisition unit calculates an amount of power that can be supplied to the lens unit if power consumption in the image capturing apparatus is reduced by limiting one or more of predetermined functions of the image capturing apparatus, in a case where the power consumption of the lens unit is larger than a calculated amount of power that can be supplied to the lens unit, the determination unit determines to stop supplying power to the lens unit, in a case where power supply to the lens unit is currently stopped, the acquisition unit recalculates an amount of power that can be supplied to the lens unit if power consumption in the image capturing apparatus is reduced by limiting one or more of predetermined functions of the image capturing apparatus, and in a case where the power consumption of the lens unit is equal to or less than the recalculated amount of power that can be supplied to the lens unit, the determination unit determines to start supplying power to the lens unit.

19. A power control method in an image capturing apparatus, having an image sensor, to which a lens unit can be attached, comprising:

receiving power supplied from a power supply;

determining whether or not to supply power to the lens unit based on at least one predetermined condition that includes a condition relating to power consumption of the lens unit;

controlling not to supply actuation power to the lens unit according to a determination result in the determining;

acquiring an amount of power that can be supplied to the lens unit out of an amount of power supplied from the power supply, wherein the image sensor is capable of performing shooting even after the controlling performs control so as not to supply actuation power to the lens unit, wherein the at least one predetermined condition includes a plurality of conditions relating to the power consumption, wherein a second condition of the plurality of conditions relating to the power consumption is that power consumption of the lens unit is less than a predetermined amount of power, and in a case where the second condition is not satisfied, an amount of power that can be supplied to the lens unit is calculated in the acquisition if power consumption in the image capturing apparatus is reduced by limiting one or more of predetermined functions of the image capturing apparatus, and wherein a fourth condition of the plurality of conditions relating to the power consumption is that the power consumption of the lens unit is less than the calculated amount of power that can be supplied to the lens unit, and in a case where the fourth condition is not satisfied, it is determined not to supply power to the lens unit in the determining.

20. A non-transitory computer-readable storage medium, the storage medium storing a program that is executable by the computer, wherein the program includes program code for causing the computer to perform as a power control method in an image capturing apparatus, having an image sensor, to which a lens unit can be attached, comprising:

receiving power supplied from a power supply;
determining whether or not to supply power to the lens unit based on at least one predetermined condition that includes a condition relating to power consumption of the lens unit;
controlling not to supply actuation power to the lens unit according to a determination result in the determining; and
acquiring an amount of power that can be supplied to the lens unit out of an amount of power supplied from the power supply,
wherein the image sensor is capable of performing shooting even after the controlling performs control so as not to supply actuation power to the lens unit,
wherein the at least one predetermined condition includes a plurality of conditions relating to the power consumption,
wherein a second condition of the plurality of conditions relating to the power consumption is that power consumption of the lens unit is less than a predetermined amount of power, and
in a case where the second condition is not satisfied, an amount of power that can be supplied to the lens unit is calculated in the acquisition if power consumption in the image capturing apparatus is reduced by limiting one or more of predetermined functions of the image capturing apparatus, and
wherein a fourth condition of the plurality of conditions relating to the power consumption is that the power consumption of the lens unit is less than the calculated amount of power that can be supplied to the lens unit, and
in a case where the fourth condition is not satisfied, it is determined not to supply power to the lens unit in the determining.

21. An image capturing apparatus to which a lens unit can be attached, comprising:

an image sensor;
a power supply that supplies power; and
one or more processors and/or circuitry which functions as:
a determination unit that determines whether or not to supply power to the lens unit based on at least one predetermined condition that includes at least one condition relating to power consumption of the lens unit; and
a control unit that performs control so as not to supply actuation power to the lens unit according to a determination result by the determination unit; and
an acquisition unit that repeatedly acquires an amount of power that can be supplied to the lens unit out of an amount of power supplied from the power supply,
wherein the image sensor is capable of performing shooting even after the control unit performs control so as not to supply actuation power to the lens unit,
wherein the at least one predetermined condition includes a plurality of conditions relating to the power consumption, and
wherein after the determination unit determines to supply power to the lens unit,
in a case where power is being supplied to the lens unit and power consumption of the lens unit is larger than the amount of power that can be supplied to the lens unit, the acquisition unit calculates an amount of power that can be supplied to the lens unit if power consumption in the image capturing apparatus is reduced by limiting one or more of predetermined functions of the image capturing apparatus,
in a case where the power consumption of the lens unit is larger than a calculated amount of power that can be supplied to the lens unit, the determination unit determines to stop supplying power to the lens unit,
in a case where power supply to the lens unit is currently stopped, the acquisition unit recalculates an amount of power that can be supplied to the lens unit if power consumption in the image capturing apparatus is reduced by limiting one or more of predetermined functions of the image capturing apparatus, and
in a case where the power consumption of the lens unit is equal to or less than the recalculated amount of power that can be supplied to the lens unit, the determination unit determines to start supplying power to the lens unit.

22. An image capturing apparatus to which a lens unit can be attached, comprising:

an image sensor;
a power supply that supplies power; and
one or more processors and/or circuitry which functions as:
a determination unit that determines whether or not to supply power to the lens unit based on at least one predetermined condition that includes at least one condition relating to power consumption of the lens unit;
a control unit that performs control so as not to supply actuation power to the lens unit according to a determination result by the determination unit; and
an acquisition unit that acquires an amount of power that can be supplied to the lens unit out of an amount of power supplied from the power supply,
wherein the image sensor is capable of performing shooting even after the control unit performs control so as not to supply actuation power to the lens unit,
wherein the at least one predetermined condition includes a plurality of conditions relating to the power consumption,
wherein a third condition of the plurality of conditions relating to the power consumption is that power consumption of the lens unit is equal to or less than an amount of power that can be supplied to the lens unit, and
in a case where the third condition is not satisfied, the acquisition unit calculates an amount of power that can be supplied to the lens unit if power consumption in the image capturing apparatus is reduced by limiting one or more of predetermined functions of the image capturing apparatus,
wherein a fourth condition of the plurality of conditions relating to the power consumption is that the power consumption of the lens unit is less than the calculated amount of power that can be supplied to the lens unit, and in a case where the fourth condition is not satisfied, the determination unit determines not to supply power to the lens unit.

23. A power control method in an image capturing apparatus, having an image sensor, to which a lens unit can be attached, comprising:

receiving power supplied from a power supply;

determining whether or not to supply power to the lens unit based on at least one predetermined condition that includes a condition relating to power consumption of the lens unit;

controlling not to supply actuation power to the lens unit according to a determination result in the determining; and repeatedly acquiring an amount of power that can be supplied to the lens unit out of an amount of power supplied from the power supply, wherein the image sensor is capable of performing shooting even after the controlling performs control so as not to supply actuation power to the lens unit, wherein the at least one predetermined condition includes a plurality of conditions relating to the power consumption, and wherein after it is determined to supply power to the lens unit in the determination, in a case where power is being supplied to the lens unit and power consumption of the lens unit is larger than the amount of power that can be supplied to the lens unit, an amount of power that can be supplied to the lens unit is calculated in the acquisition if power consumption in the image capturing apparatus is reduced by limiting one or more of predetermined functions of the image capturing apparatus, in a case where the power consumption of the lens unit is larger than a calculated amount of power that can be supplied to the lens unit, it is determined to stop supplying power to the lens unit in the determining, in a case where power supply to the lens unit is currently stopped, an amount of power that can be supplied to the lens unit is recalculated in the acquisition if power consumption in the image capturing apparatus is reduced by limiting one or more of predetermined functions of the image capturing apparatus, and in a case where the power consumption of the lens unit is equal to or less than the recalculated amount of power that can be supplied to the lens unit, it is determined to start supplying power to the lens unit in the determining.

24. A power control method in an image capturing apparatus, having an image sensor, to which a lens unit can be attached, comprising:

receiving power supplied from a power supply;

determining whether or not to supply power to the lens unit based on at least one predetermined condition that includes a condition relating to power consumption of the lens unit;

controlling not to supply actuation power to the lens unit according to a determination result by the determination unit; and acquiring an amount of power that can be supplied to the lens unit out of an amount supplied from the power supply, wherein the image sensor is capable of performing shooting even after the controlling performs control so as not to supply actuation power to the lens unit, wherein the at least one predetermined condition includes a plurality of conditions relating to the power consumption, wherein a third condition of the plurality of conditions relating to the power consumption is that power consumption of the lens unit is equal to or less than an amount of power that can be supplied to the lens unit, and in a case where the third condition is not satisfied, an amount of power that can be supplied to the lens unit is calculated in the acquisition if power consumption in the image capturing apparatus is reduced by limiting one or more of predetermined functions of the image capturing apparatus, wherein a fourth condition of the plurality of conditions relating to the power consumption is that the power consumption of the lens unit is less than the calculated amount of power that can be supplied to the lens unit, and in a case where the fourth condition is not satisfied, it is determined not to supply power to the lens unit in the determining.

25. A non-transitory computer-readable storage medium, the storage medium storing a program that is executable by the computer, wherein the program includes program code for causing the computer to perform as a power control method in an image capturing apparatus, having an image sensor, to which a lens unit can be attached, comprising:

receiving power supplied from a power supply;

determining whether or not to supply power to the lens unit based on at least one predetermined condition that includes a condition relating to power consumption of the lens unit;

controlling not to supply actuation power to the lens unit according to a determination result in the determining; and repeatedly acquiring an amount of power that can be supplied to the lens unit out of an amount of power supplied from the power supply, wherein the image sensor is capable of performing shooting even after the controlling performs control so as not to supply actuation power to the lens unit, wherein the at least one predetermined condition includes a plurality of conditions relating to the power consumption, and wherein after it is determined to supply power to the lens unit in the determination, in a case where power is being supplied to the lens unit and power consumption of the lens unit is larger than the amount of power that can be supplied to the lens unit, an amount of power that can be supplied to the lens unit is calculated in the acquisition if power consumption in the image capturing apparatus is reduced by limiting one or more of predetermined functions of the image capturing apparatus, in a case where the power consumption of the lens unit is larger than a calculated amount of power that can be supplied to the lens unit, it is determined to stop supplying power to the lens unit in the determining, in a case where power supply to the lens unit is currently stopped, an amount of power that can be supplied to the lens unit is recalculated in the acquisition if power consumption in the image capturing apparatus is reduced by limiting one or more of predetermined functions of the image capturing apparatus, and in a case where the power consumption of the lens unit is equal to or less than the recalculated amount of power that can be supplied to the lens unit, it is determined to start supplying power to the lens unit in the determining.

26. A non-transitory computer-readable storage medium, the storage medium storing a program that is executable by the computer, wherein the program includes program code for causing the computer to perform as a power control method in an image capturing apparatus, having an image sensor, to which a lens unit can be attached, comprising:

receiving power supplied from a power supply;

determining whether or not to supply power to the lens unit based on at least one predetermined condition that includes a condition relating to power consumption of the lens unit;

controlling not to supply actuation power to the lens unit according to a determination result by the determination unit; and acquiring an amount of power that can be supplied to the lens unit out of an amount of power supplied from the power supply, wherein the image sensor is capable of performing shooting even after the controlling performs control so as not to supply actuation power to the lens unit, wherein the at least one predetermined condition includes a plurality of conditions relating to the power consumption, wherein a third condition of the plurality of conditions relating to the power consumption is that power consumption of the lens unit is equal to or less than an amount of power that can be supplied to the lens unit, and in a case where the third condition is not satisfied, an amount of power that can be supplied to the lens unit is calculated in the acquisition if power consumption in the image capturing apparatus is reduced by limiting one or more of predetermined functions of the image capturing apparatus, wherein a fourth condition of the plurality of conditions relating to the power consumption is that the power consumption of the lens unit is less than the calculated amount of power that can be supplied to the lens unit, and in a case where the fourth condition is not satisfied, it is determined not to supply power to the lens unit in the determining.

* * * * *